(12) United States Patent
Ahn et al.

(10) Patent No.: US 7,850,199 B2
(45) Date of Patent: Dec. 14, 2010

(54) STEERING ASSEMBLY (75) Inventors: Jung Bae Ahn, Gyeonggi-do (KR); Hyun Do Ki, Gyeonggi-do (KR)

(73) Assignees: Hyundai Mobis Co., Ltd., Gyeonggi-Do (KR); Afas Co., Ltd., Gyeonggi-Do (KR)

( * ) Notice: Subject to any disclaimer, the term of this patent is extended or adjusted under 35 U.S.C. 154(b) by 357 days.

(21) Appl. No.: 12/028,059

(22) Filed: Feb. 8, 2008

(65) Prior Publication Data

US 2009/0127811 A1 May 21, 2009

(30) Foreign Application Priority Data

Nov. 16, 2007 (KR) ...................... 10-2007-0117261

(51) Int. Cl.
*B60R 21/203* (2006.01)
(52) U.S. Cl. .................. 280/731; 280/728.2; 200/61.54
(58) Field of Classification Search .............. 280/728.2, 280/731; 200/61.54
See application file for complete search history.

(56) References Cited

U.S. PATENT DOCUMENTS

| | | | | |
|---|---|---|---|---|
| 79,801 A | * | 7/1868 | Adams | 292/153 |
| 5,207,544 A | * | 5/1993 | Yamamoto et al. | 411/348 |
| 5,333,897 A | * | 8/1994 | Landis et al. | 280/728.2 |
| 5,350,190 A | * | 9/1994 | Szigethy | 280/728.2 |
| 5,590,900 A | * | 1/1997 | Duran et al. | 280/728.2 |
| 5,624,130 A | * | 4/1997 | Ricks | 280/728.2 |
| 5,630,611 A | * | 5/1997 | Goss et al. | 280/728.2 |
| 5,639,113 A | * | 6/1997 | Goss et al. | 280/728.2 |
| 5,947,509 A | * | 9/1999 | Ricks et al. | 280/728.2 |
| RE36,351 E | * | 10/1999 | Yamamoto et al. | 280/728.2 |
| 6,257,615 B1 | * | 7/2001 | Bohn et al. | 280/728.2 |
| 6,616,180 B2 | * | 9/2003 | Schutz | 280/731 |
| 6,695,343 B1 | * | 2/2004 | Christiansen et al. | 280/731 |
| 6,830,263 B2 | * | 12/2004 | Xu et al. | 280/731 |
| 7,465,137 B2 | * | 12/2008 | Dietz et al. | 411/386 |
| 2004/0251673 A1 | | 12/2004 | Lee | |
| 2005/0051985 A1 | | 3/2005 | Kim | |
| 2005/0067805 A1 | | 3/2005 | Kim | |
| 2005/0275207 A1 | | 12/2005 | Park | |
| 2006/0049620 A1 | | 3/2006 | Lee | |
| 2006/0175816 A1 | * | 8/2006 | Spencer et al. | 280/731 |
| 2009/0079168 A1 | * | 3/2009 | Umemura et al. | 280/728.2 |
| 2009/0085334 A1 | * | 4/2009 | Matsu et al. | 280/731 |

FOREIGN PATENT DOCUMENTS

| KR | 20-0311159 | 4/2003 |
|---|---|---|
| KR | 1020060084899 | 7/2006 |

* cited by examiner

*Primary Examiner*—Paul N Dickson
*Assistant Examiner*—Drew Brown
(74) *Attorney, Agent, or Firm*—Greenblum & Bernstein P.L.C.

(57) ABSTRACT

A steering assembly according to the present invention includes connection parts that are formed in a mounting plate body and fixed to a steering wheel module. Accordingly, when the mounting plate assembly is fixed to a steering wheel module, it is possible to attach or detach the mounting plate assembly to or from the steering wheel module. As a result, it is possible to quickly assemble the mounting plate assembly and the steering wheel module.

15 Claims, 9 Drawing Sheets

STEERING ASSEMBLY

BACKGROUND OF THE INVENTION

1. Field of the Invention

The present invention relates to a steering assembly, and more particularly, to a steering assembly in which a mounting plate assembly and a steering wheel module are easily assembled to each other.

2. Description of the Related Art

In the related art, in order to assemble a mounting plate body to a steering wheel module, a horn plate assembly is generally fixed to a mounting plate assembly and thereafter fixed to a steering wheel module. Meanwhile, during the assembling, the steering wheel module is fixed to the side surface of the horn plate assembly by using bolts. In the above-mentioned case, a worker performs work at the side surface of the horn plate assembly. For this reason, there are problems in that it is inconvenient to perform the work and it is difficult to quickly perform the work.

SUMMARY OF THE INVENTION

An object of the present invention is to provide a steering assembly in which a mounting plate assembly and a steering wheel module are easily fixed to each other.

According to an aspect of the present invention, a steering assembly includes a mounting plate body, a steering wheel module, and pins. The steering wheel module is fixed to the mounting plate body and controls the direction of a vehicle. The pins are fitted to portions of the mounting plate body corresponding to the steering wheel module, and are inserted and fixed to insertion portions formed in the steering wheel module.

According to another aspect of the present invention, a steering assembly includes a mounting plate body, a steering wheel module, and connection parts. The steering wheel module is fixed to the mounting plate body and controls the direction of a vehicle. The connection parts are fitted to portions of the mounting plate body corresponding to the steering wheel module. The connection parts are fixed to insertion portions that are formed in the connection parts in a linear direction with respect to the steering wheel module.

In the steering assembly according to the present invention, connection parts formed in the mounting plate body can be directly fixed to the steering wheel module. Accordingly, it is possible to easily assemble the steering assembly and to reduce the amount of time required to assemble the steering assembly.

BRIEF DESCRIPTION OF THE DRAWINGS

The above and other features and advantages of the present invention will become more apparent by describing in detail preferred embodiments thereof with reference to the attached drawings in which.

DESCRIPTION OF THE PREFERRED EMBODIMENTS

Figure 1:
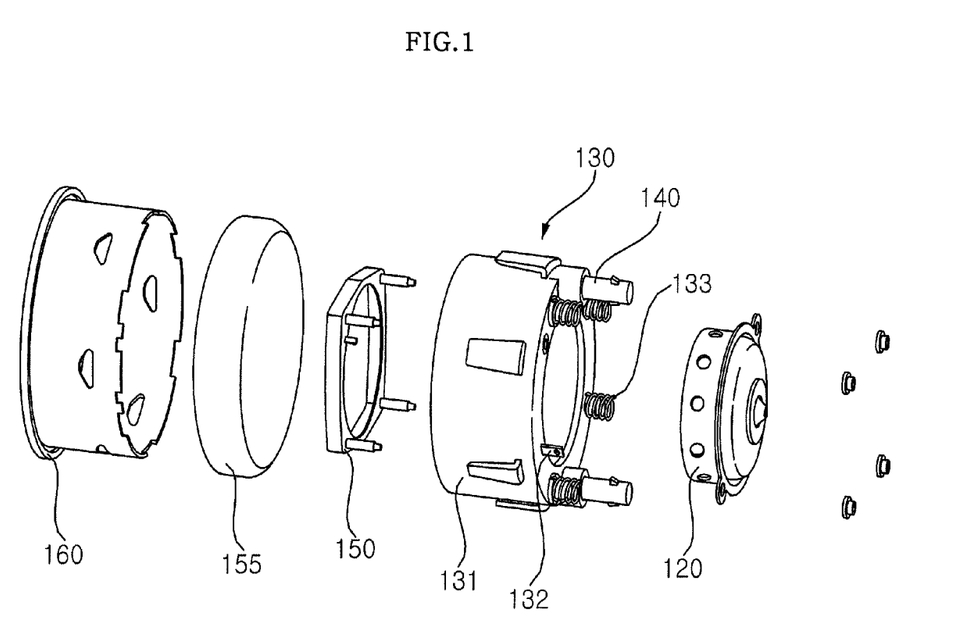
FIG. 1 is an exploded perspective view of a steering assembly according to an embodiment of the present invention.
Figure 2:
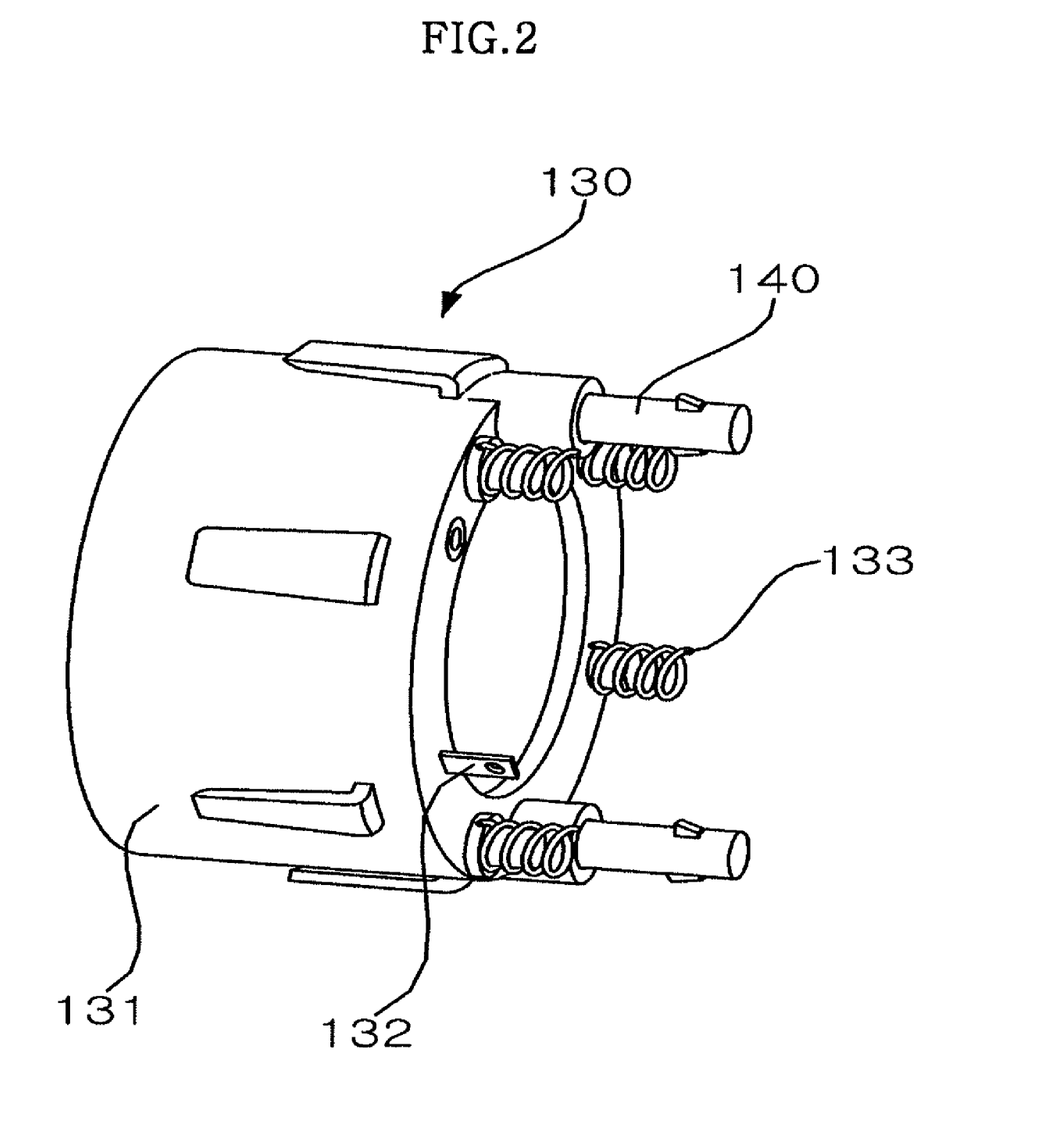
FIG. 2 is a perspective view of a mounting plate assembly shown in FIG. 1.
Figure 3:
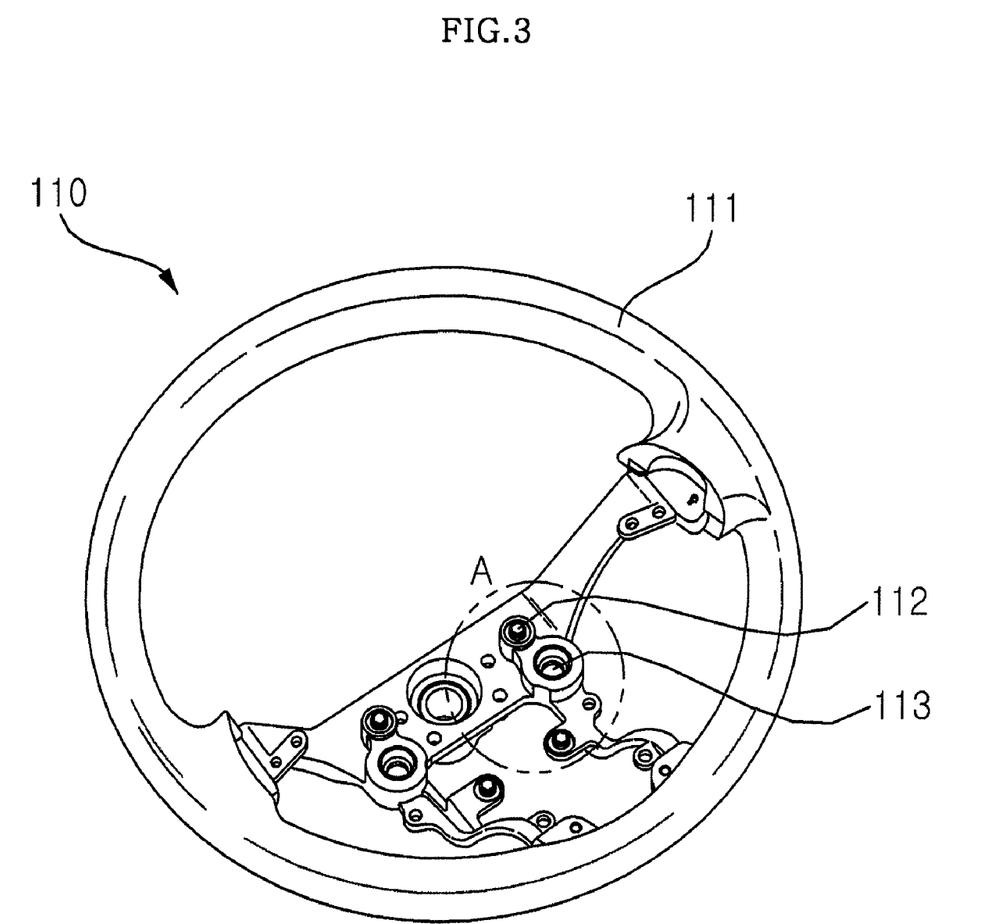
FIG. 3 is a perspective view of a steering wheel module shown in FIG. 1.
Figure 4:
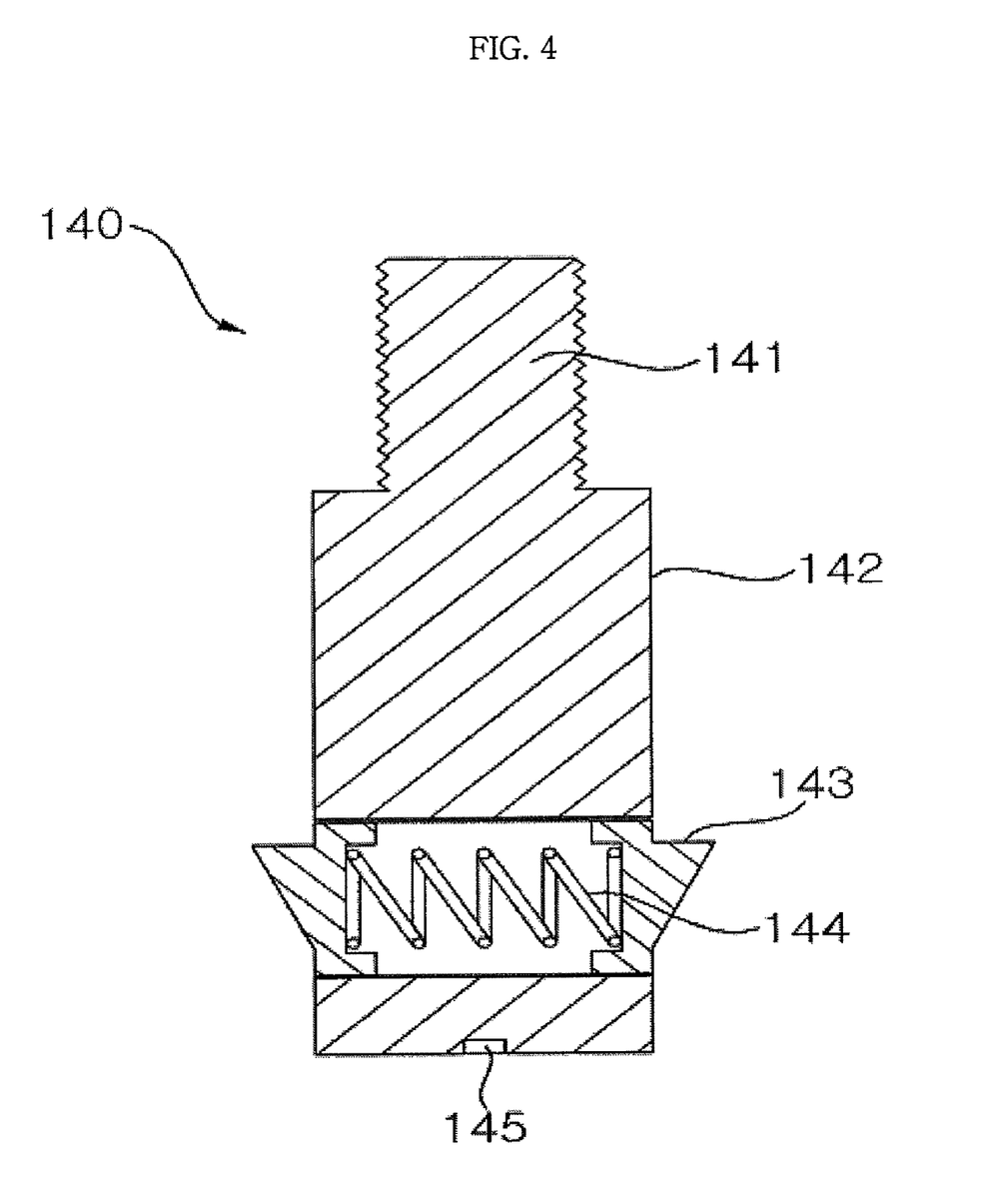
FIG. 4 is a cross-sectional view of an example of a connection part shown in FIG. 2.
Figure 5:
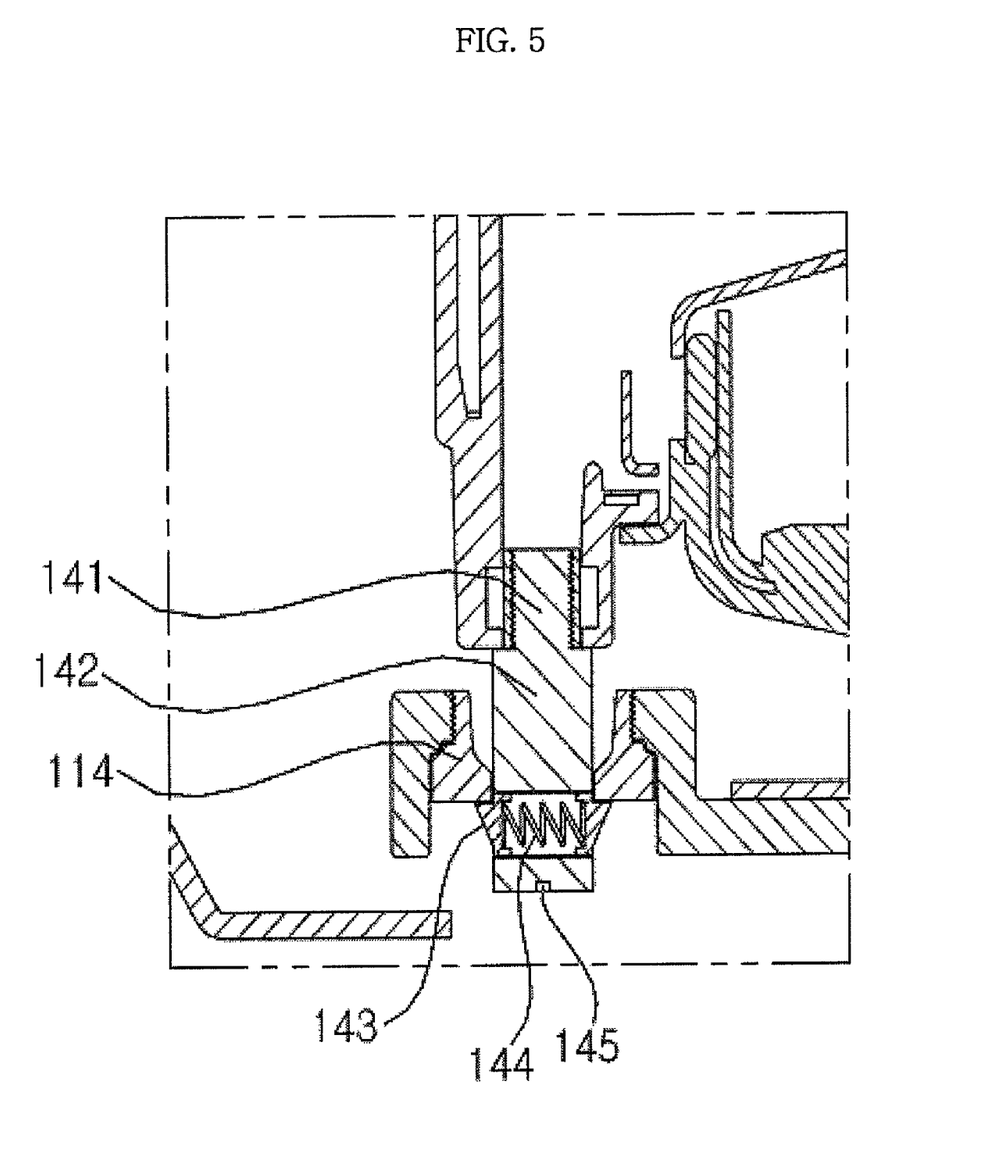
FIG. 5 is a cross-sectional view showing that the mounting plate assembly shown in FIG. 2 and the steering wheel module shown in FIG. 3 are assembled to each other.

FIG. 1 is an exploded perspective view of a steering assembly 100 according to an embodiment the present invention. FIG. 2 is a perspective view of a mounting plate assembly 130 shown in FIG. 1. FIG. 3 is a perspective view of a steering wheel module 110 shown in FIG. 1. FIG. 4 is a cross-sectional view of an example of a connection part 140 shown in FIG. 2. FIG. 5 is a cross-sectional view showing that the mounting plate assembly 130 shown in FIG. 2 and the steering wheel module 110 shown in FIG. 3 are assembled to each other.

Referring to FIG. 1, the steering assembly 100 includes a steering wheel module 110, an inflator 120, a mounting plate assembly 130, a retainer ring assembly 150, a cushion 155, and a cover 160. The steering wheel module controls the direction of a vehicle. The inflator is provided on the steering wheel module 110, and discharges compressed air. The mounting plate assembly is fitted to the inflator 120 and the steering wheel module 110, and serves as a guide for the cushion 155. The retainer ring assembly is provided on the mounting plate assembly 130, and is fixed to the inflator 120. The cushion is provided on the retainer ring assembly 150, and is inflated by the compressed air discharged from the inflator 120 during the vehicle collision. The cover is fixed to the mounting plate assembly 130, and serves as a guide during the inflation of the cushion 155.

Referring to FIG. 2, the mounting plate assembly 130 includes a mounting plate body 131, connection parts 140, horn tracks 132, and horn springs 133. The inflator 120 is fitted into the mounting plate body 131. The connection parts 140 are formed at the mounting plate body 131, and fitted to the steering wheel module 110. When a horn operating force is applied to the cover 160, the horn tracks come in contact with receiving parts 112, so that current flows in the horn tracks. When the horn operating force is not applied to the cover, the horn springs cause the horn tracks 132 to be separated from the receiving parts 112.

Referring to FIG. 3, the steering wheel module 110 includes a steering wheel 111, fixing holes 113, and receiving parts 114. The steering wheel allows a driver to easily control the direction of a vehicle, and is fixed to the mounting steering assembly 130. The fixing holes are formed in the steering wheel 111 and fitted to the connection parts 140. The receiving parts 114 are formed in the steering wheel 111. When the receiving parts 114 come in contact with the horn tracks 132, current flows in the receiving parts 114.

Referring to FIG. 4, the steering wheel module 110 is fixed to the mounting plate assembly 130. The connection parts 140 are formed in the mounting plate body 131. Each of the connection parts 140 has a shape that allows the steering wheel module 110 to be firmly fixed to the mounting plate assembly 130. For example, each of the connection parts may be formed of a pin 140. Each of the pins 140 includes a fixture portion 141, a body portion 142, protrusions 143, an elastic member 144, and a tool connection portion 145. The fixture portion is fixed to the mounting plate assembly 130. The body portion is integrally formed with the fixture portion 141, and supports the weight of the mounting plate assembly 130 and the horn operating force. The protrusions are provided in the body portion 142 and fitted to the steering wheel module 110. The elastic member is fitted to the protrusions. After each of the protrusions 143 is pushed inward in the body portion 142 by a predetermined distance, the elastic member causes the protrusions 143 to return to initial positions. The tool connection portion is formed on the body portion 142, and makes the pin 140 be easily separated by using a tool. The tool connection portion 145 may be formed on the lower surface of the body portion 142 so that a tool can be easily connected to the tool connection portion. Further, the tool connection portion 145 may be formed on the side surface of the body portion 142.

Referring to FIG. 5, a worker fixes the mounting plate assembly 130 to the steering wheel module 110 in an "A" direction, that is, from the upper side of the steering wheel module toward the lower side thereof. When the mounting plate assembly is fixed to the steering wheel module in the "A" direction, the pins 140 are fitted into the fixing holes 113 formed in the steering wheel module 110. A structure, which can be easily and firmly fixed to the fixing hole 113, is formed at the lower portion of each of the pins 140. The structure may be formed of the protrusions 143. Each of the protrusions 143 has a tapered shape of which width is increased from the lower side toward the upper side thereof. When a worker applies a force to the mounting plate assembly in the "A" direction in order to fix the mounting plate assembly to the steering wheel module, the lower portions of the protrusions 143 come in contact with the fixing holes 113 because the width of the lower portions of the protrusions is small. The lower portions of the protrusions 143 are gradually inserted into the fixing hole 113. If the worker continuously applies a force to the mounting plate assembly, the protrusions 143 are gradually moved into the body portion 142. After the upper portions of the protrusions 143 pass by the fixing holes 113, the protrusions 143 return to the initial positions due to the elastic member 144 that is fitted to the protrusions 143. Accordingly, the width of the upper portions of the protrusions 143 becomes larger than the inner diameter of the fixing hole 113. As a result, it is possible to prevent the mounting plate assembly 130 from being separated from the steering wheel module 110. Further, the springs 133 are provided to the horn tracks 132, so that a predetermined gap may be maintained between the mounting plate assembly 130 and the steering wheel module 110. Meanwhile, when the mounting plate assembly 130 is separated from the steering wheel module 110, a worker can easily separate the pins 140 from the mounting plate assembly 130. When a worker rotates a tool after connecting the tool to the tool connection portion 145, the threaded connection between the fixture portion 141 and the mounting plate assembly 130 is released. The pins 140 are separated from the mounting plate assembly 130 on the lower side of the mounting plate assembly, and the body portions 142 pass through the fixing holes 113, which makes it possible to easily separate the pins. Accordingly, a worker can easily separate the mounting plate assembly 130 from the steering wheel module 110. Further, since a worker does not fix the mounting plate assembly to the side surface of the steering wheel module 110, it is possible to easily perform the work. Further, it is possible to maintain a force similar to the fixing force when the mounting plate assembly 130 is fixed to the side surface of the steering wheel module 110 by bolts.

Figure 6:
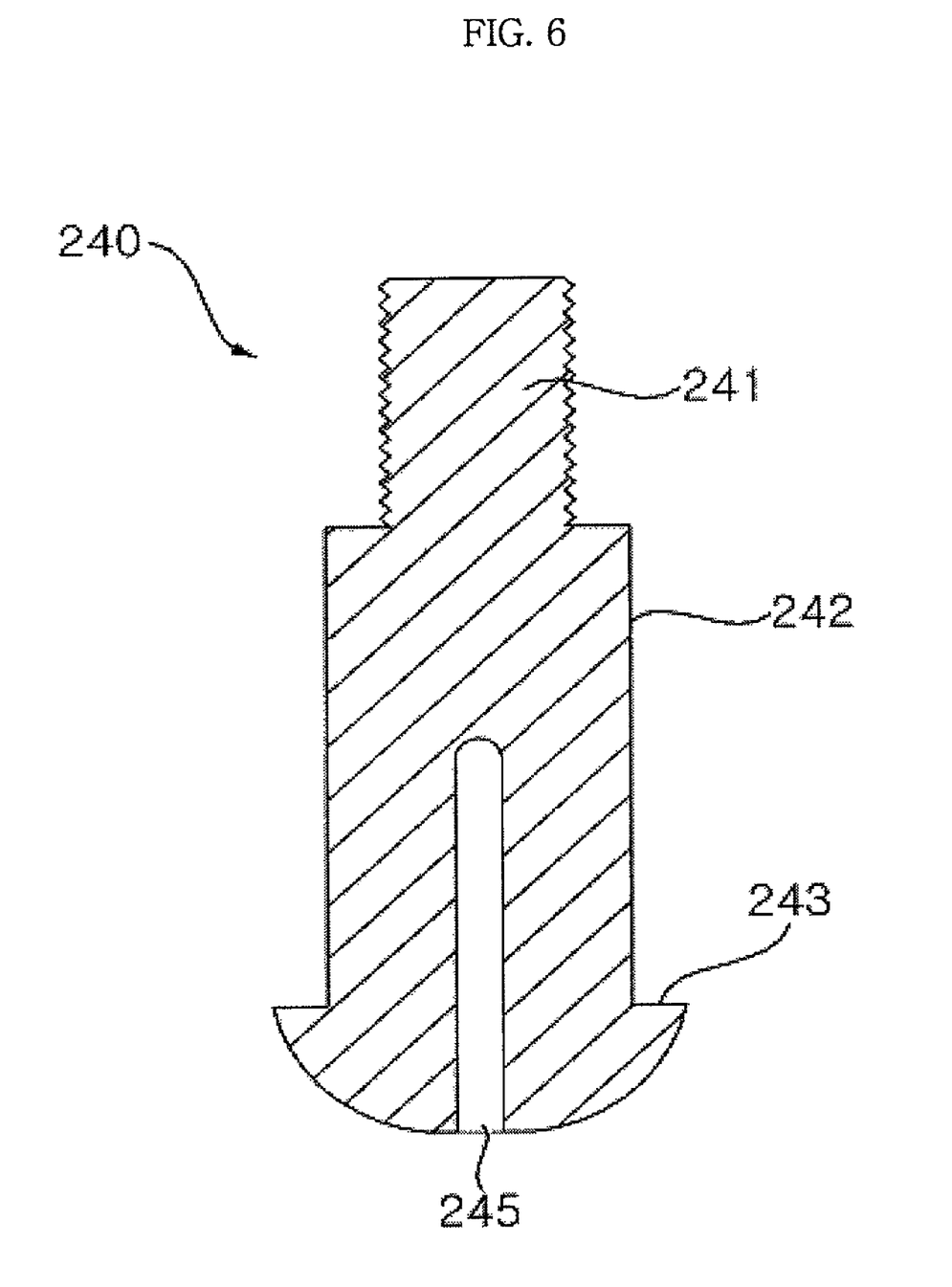
FIG. 6 is a cross-sectional view of another example of the connection part shown in FIG. 2.

FIG. 6 is a cross-sectional view of another example of the connection part 140 shown in FIG. 2. The same reference numerals as those in the above-mentioned example refer to the same elements, and difference between the example and another example will be described below with reference to FIG. 8.

Referring to FIG. 6, protrusions 243 are formed at the lower end of a body portion 242. The protrusions 243 are not connected to each other by an elastic member, and protrude from the body portion 242. Each of the protrusions is made of an elastic material. A gap is formed between the protrusions 243. When a worker fits pins 240 into fixing holes 113 during the assembling, the protrusions 243 are pushed inward toward the gap. After passing by a predetermined space, the protrusions 243 return to initial positions due to a restoring force. Accordingly, the width of the protrusions 243, which are formed at the lower end of the body portion, becomes larger than the inner diameter of the fixing hole 113. As a result, the pin is not pushed upward. Further, the springs 133 are provided to the horn tracks 132, so that a predetermined gap may be maintained between the mounting plate assembly 130 and the steering wheel module 110. A method of separating the mounting plate assembly 130 from the steering wheel module 110 is similar as described with reference to FIG. 4. Accordingly, a worker can easily assemble the mounting plate assembly 130 to the steering wheel module 110 or separate the mounting plate assembly from the steering wheel module.

Figure 7:
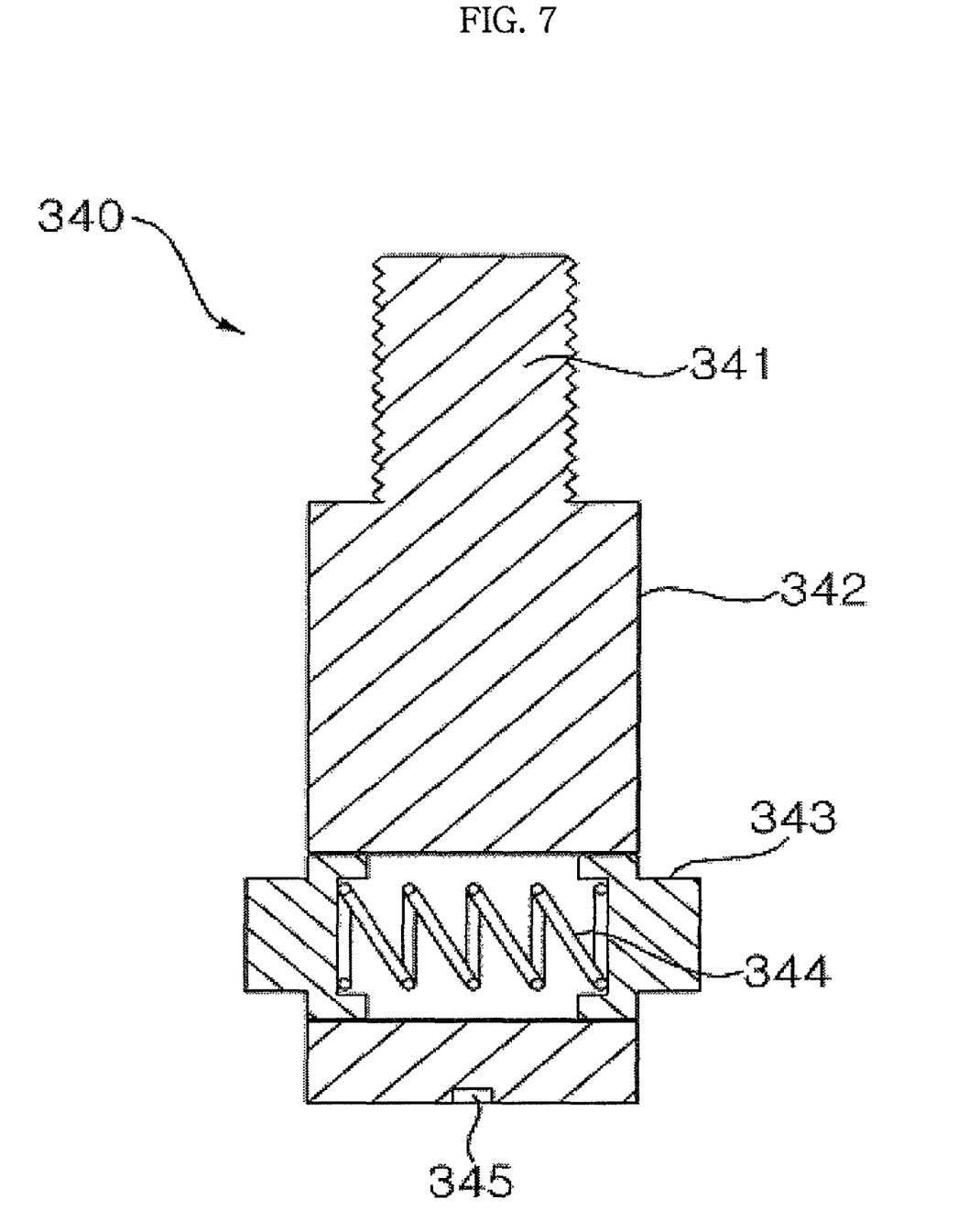
FIG. 7 is a cross-sectional view of still another example of the connection part shown in FIG. 2.

FIG. 7 is a cross-sectional view of still another example of the connection part 340 shown in FIG. 2. The same reference numerals as those in the above-mentioned example refer to the same elements, and difference between the above example and the example below will be described below with reference to FIG. 7.

Referring to FIG. 7, upper and lower portions of protrusions 343, which are provided at the lower portion of a body portion 342, may be formed so as to maintain a constant gap. When a mounting plate assembly 130 is fixed to a steering wheel module 110, the protrusions 343 retreat inward in the body portion 342. After passing by fixing holes 113, the protrusions 343 protrude toward the outside due to the elastic member. Accordingly, the protrusions 343 firmly fix the mounting plate assembly 130 to the steering wheel module 110. The separation of the mounting plate assembly 130 from the steering wheel module 110 is similar as described above. Since the mounting plate assembly 130 is fixed to the steering wheel module 110 from the upper side of the steering wheel module 110 toward the lower side thereof, a worker can easily perform the work. Further, it is possible to separate the pins 340 from the mounting plate assembly 130 in such a manner that the threaded connection is released after connecting a tool to a tool connection part 345. Therefore, when detecting defects of an airbag or the steering wheel module 110, a worker can easily perform the work. As a result, it is possible to reduce the amount of time and cost.

Figure 8:
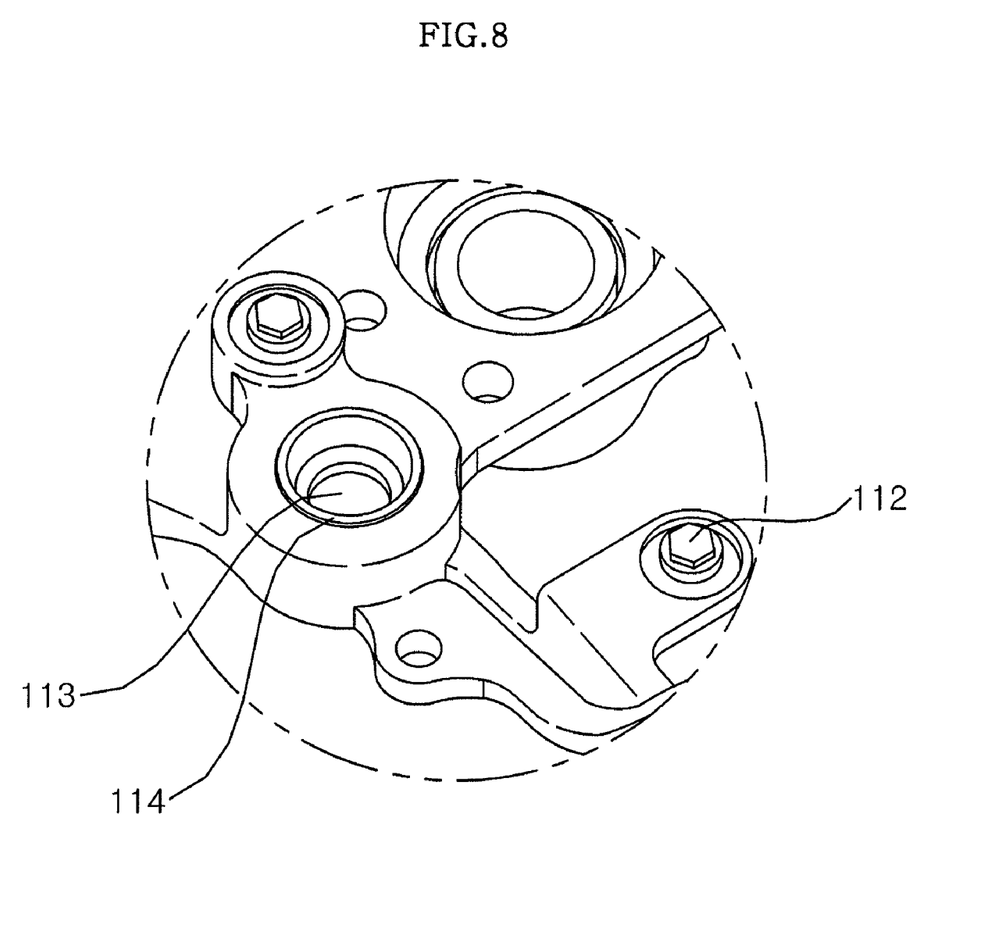
FIG. 8 is an enlarged perspective view of a portion "A" shown in FIG. 3.
Figure 9:
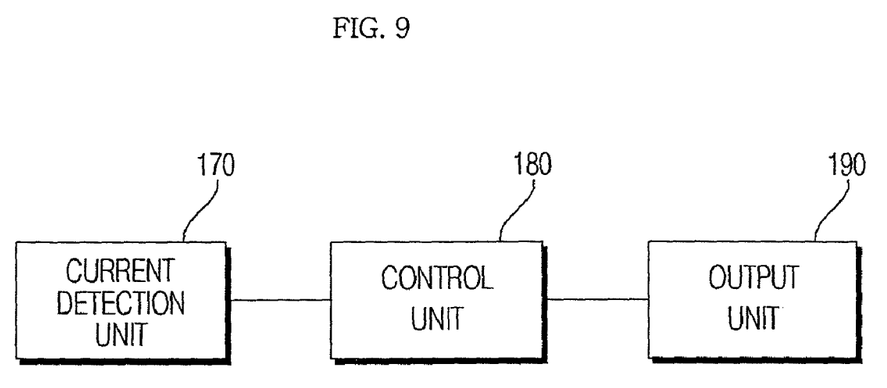
FIG. 9 is a block diagram illustrating a method of controlling the operation of a horn of the steering assembly shown in FIG. 1.

FIG. 8 is an enlarged perspective view of a portion "A" shown in FIG. 3. FIG. 9 is a block diagram illustrating a method of controlling the operation of a horn of the steering assembly 100 shown in FIG. 1.

Referring to FIGS. 3 and 8, the steering wheel module 110 includes a steering wheel 111, receiving parts 112, and fixing holes 113. When driving a vehicle, a user applies a force to the steering wheel. The receiving parts are formed in the steering wheel 111. When a horn operating force is applied to the cover 160, the receiving parts come in contact with the horn tracks 132 and current flows in the receiving parts 112. The fixing holes are fixed to the connection parts 140 so that the mounting plate assembly 130 is fixed to the steering wheel module 110.

Referring to FIG. 9, when a user applies a horn operating force to the cover 160, a force is applied to the mounting plate assembly 130 by the cover 160. The mounting plate assembly 130 is moved downward, and the horn tracks 132 formed in the mounting plate assembly 130 come in contact with the receiving parts 112. Since the electric potential of each of the horn tracks 132 is different from the electric potential of each of the receiving parts 112, current flows. If current flows, a current detection unit 170 detects the current. The current detection unit 170 converts the detected current into data, and sends the data to a control unit 180. The control unit 180 determines whether a user operates a horn, on the basis of the data. After the determination, the control unit 180 sends a horn operating signal to an output unit 190. The signal is converted into the form, which can be perceived outside a vehicle, such as sound, and is output by an output unit 190. Accordingly, when the steering assembly 100 is assembled, a separate horn plate (not shown) does not need to be provided. As a result, it is possible to reduce cost required to assemble the steering assembly 100. Further, since the connection part is integrally formed with the mounting plate assembly 130, it is possible to easily and accurately assemble the steering assembly.

What is claimed is:

1. A steering assembly comprising:
    a mounting plate body;
    a steering wheel module that is fixed to the mounting plate body and controls direction of a vehicle; and
    pins that are fitted to portions of the mounting plate body corresponding to the steering wheel module, and are inserted and fixed to insertion portions formed in the steering wheel module,
    wherein each of the pins includes:
    a body portion that is inserted into each of the insertion portions;
    protrusions that are provided in the body portion, and fitted into the insertion portions so as to fix the mounting plate body to the steering wheel module;
    an elastic member that is fitted to the protrusions and configured to return the protrusions to initial positions after the protrusions are pushed inward in the body portion and pass by the insertion portions; and
    a hole that penetrates the body portion in a left and right direction of the body portion, the elastic member being movably placed inside the hole of the body portion.

2. The steering assembly according to claim 1, wherein the pins are fixed to the steering wheel module in a linear direction.

3. The steering assembly according to claim 1, wherein the widths of the protrusions are decreased in a direction in which the protrusions are inserted into the insertion portions.

4. The steering assembly according to claim 3, wherein the body portion includes a connection part that is formed at an upper portion thereof and is thread-connected to the mounting plate body.

5. The steering assembly according to claim 4, further comprising:
    a tool connection groove that is formed in the body portion,
        a tool used to release the connection between the mounting plate body and a fixture part being connected to the tool connection groove.

6. The steering assembly according to claim 1, wherein the widths of the protrusions are constant.

7. The steering assembly according to claim 6, wherein the body portion includes a connection part that is formed at an upper portion thereof and is thread-connected to the mounting plate body.

8. The steering assembly according to claim 7, further comprising:
    a tool connection groove that is formed in the body portion,
        a tool used to release the connection between the mounting plate body and a fixture part being connected to the tool connection groove.

9. The steering assembly according to claim 1, wherein the body portion includes a connection part that is formed at an upper portion thereof and is thread-connected to the mounting plate body.

10. The steering assembly according to claim 9, further comprising:
    a tool connection groove that is formed in the body portion,
        a tool used to release the connection between the mounting plate body and a fixture part being connected to the tool connection groove.

11. The steering assembly according to claim 10, wherein the tool connection groove is formed at the lower portion of the body portion.

12. The steering assembly according to claim 11, further comprising:
    horn tracks that are formed in the mounting plate body, an electric potential being formed in the horn tracks; and
    receiving parts that are formed in the steering wheel module, wherein current flows in the receiving parts when the receiving parts contact with the horn tracks.

13. The steering assembly according to claim 12, wherein a plurality of pins are fitted to the mounting plate body.

14. The steering assembly according to claim 1, wherein the body portion includes a connection part that is formed at an upper portion thereof and is thread-connected to the mounting plate body.

15. The steering assembly according to claim 14, further comprising:
    a tool connection groove that is formed in the body portion,
        a tool used to release the connection between the mounting plate body and a fixture part being connected to the tool connection groove.

* * * * *